(12) United States Patent
Keller et al.

(10) Patent No.: US 7,914,053 B2
(45) Date of Patent: Mar. 29, 2011

(54) FLANGE CONNECTION

(75) Inventors: Pierino Keller, Trübbach (CH); Pascal Good, Plons (CH)

(73) Assignee: Inficon GmbH, Bad Ragaz (CH)

( * ) Notice: Subject to any disclaimer, the term of this patent is extended or adjusted under 35 U.S.C. 154(b) by 64 days.

(21) Appl. No.: 12/537,024

(22) Filed: Aug. 6, 2009

(65) Prior Publication Data
US 2009/0295155 A1 Dec. 3, 2009

(30) Foreign Application Priority Data

Jan. 10, 2008 (CH) ........................................ 1556/08

(51) Int. Cl.
*F16L 23/00* (2006.01)
(52) U.S. Cl. ........................................ 285/365; 285/364
(58) Field of Classification Search .................. 285/363, 285/364, 365, 366, 367, 368
See application file for complete search history.

(56) References Cited

U.S. PATENT DOCUMENTS

| | | | | | |
|---|---|---|---|---|---|
| 2,449,795 | A | * | 9/1948 | Stillwagon | 285/367 |
| 2,769,648 | A | * | 11/1956 | Herman | 285/366 |
| 3,178,206 | A | * | 4/1965 | Martin et al. | 285/367 |
| 3,212,798 | A | * | 10/1965 | Lewis et al. | 285/368 |
| 3,398,978 | A | * | 8/1968 | Gasche | 285/367 |
| 3,524,662 | A | * | 8/1970 | Hudson, Jr. et al. | 285/368 |
| 3,704,021 | A | * | 11/1972 | Barbarin et al. | 285/368 |
| 3,977,709 | A | * | 8/1976 | Hatzis | 285/368 |
| 4,326,737 | A | * | 4/1982 | Lehmann | 285/365 |
| 4,413,845 | A | * | 11/1983 | Lawrence | 285/368 |
| 4,619,470 | A | * | 10/1986 | Overath et al. | 285/368 |
| 4,779,903 | A | * | 10/1988 | Maier et al. | 285/368 |
| 5,076,617 | A | * | 12/1991 | Bronnert | 285/367 |
| 5,308,125 | A | * | 5/1994 | Anderson, Jr. | 285/363 |
| 5,333,919 | A | * | 8/1994 | Nerenberg | 285/363 |
| 5,468,023 | A | * | 11/1995 | Galle et al. | 285/368 |
| 6,070,911 | A | * | 6/2000 | Namikawa et al. | 285/364 |
| 6,905,141 | B2 | * | 6/2005 | Winter et al. | 285/368 |

FOREIGN PATENT DOCUMENTS

DE 3605944 A1 * 8/1987
FR 2680222 A1 * 2/1993

* cited by examiner

*Primary Examiner* — David E Bochna
(74) *Attorney, Agent, or Firm* — Notaro, Michalos & Zaccaria P.C.

(57) ABSTRACT

A flange connection has two pipe ends (1', 2', 51', 52') on each of which one flange (1, 2, 51, 52) is disposed and which have flange faces (11, 11', 61, 61') and a centering ring (33, 34) with an elastomer sealing ring (14) in contact with the ring. Both flanges include a mechanism for the detachable clamping against one another such that the flange faces (11, 11', 61, 61') are in contact on the centering ring and thereby are held at a predetermined flange distance (10, 60, D). The elastomer sealing ring (14) is pressed on the flange faces (11, 11', 61, 61') in the direction of the pipe axes (15) forming a seal, wherein the centering ring (33, 34) is positioned such that it is at least partially in contact on the periphery of the flanges (1, 2, 51, 52). A bearing mechanism (18) is disposed thereon, annularly directed inwardly, about which the elastomer sealing ring (14), which is U-shaped in cross section, is disposed such that on the side flanks of the U-shape, on both sides, an annular areal flange contact zone (6, 6', 56, 56', B) is formed.

13 Claims, 9 Drawing Sheets

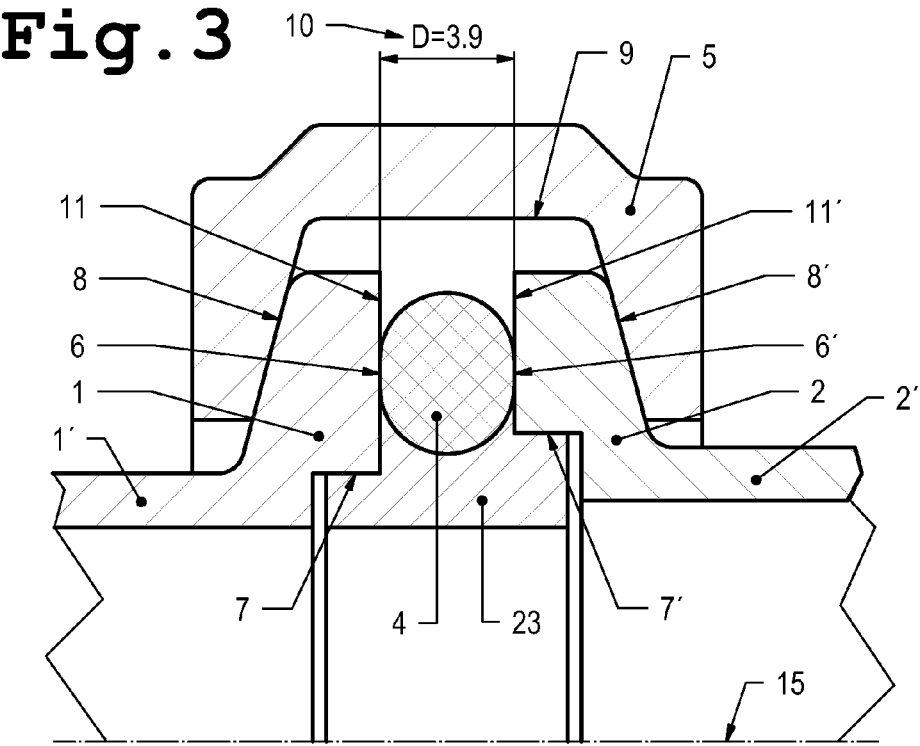
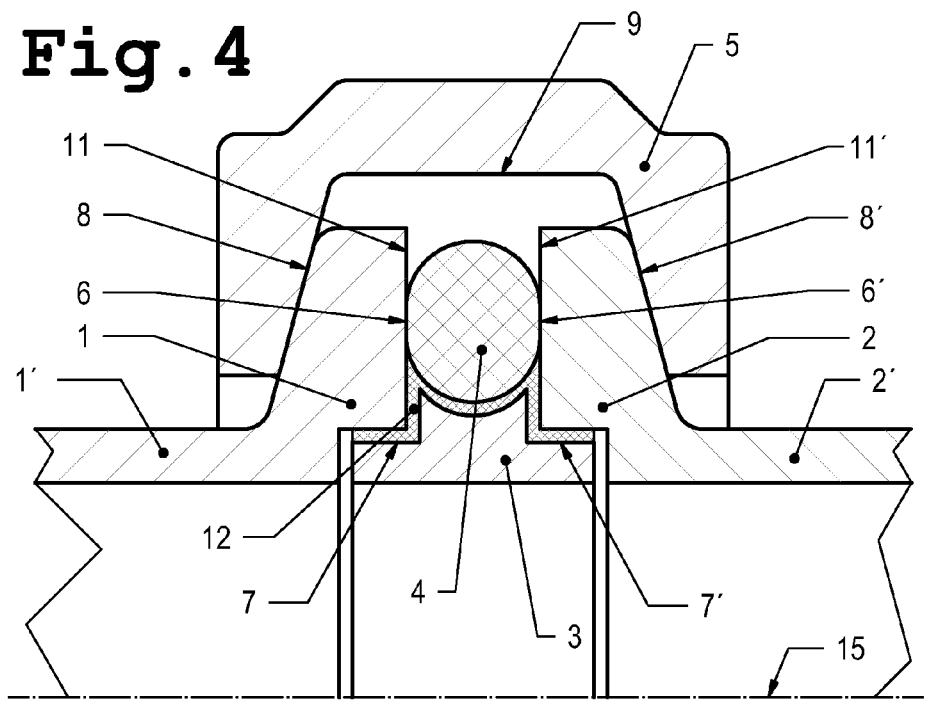

FLANGE CONNECTION

FIELD AND BACKGROUND OF THE INVENTION

The invention relates to a flange connection.

Elastomer-sealed flange connections for the simple, quick and tight connection of two pipe parts have been known for a long time and in the most diverse types and are utilized in particular in vacuum technology when setting up vacuum systems.

Such elastomer-sealed flange connections are standardized as small flange connections, denoted as ISO-KF flanges, and as bolted flange connections, for example denoted as ISO-K flanges, internationally via PNEUROP (www.pneurop.org) or ISO (www.iso.org) and are applied in the vacuum industry.

The main nominal dimensions in small flange connections are: DN 10/16/25/40/50 ISO-KF and the auxiliary nominal dimensions: DN 20/32 ISO-KF. The dimensions are defined according to DIN 28403 and also according to ISO 2861/I. The two pipe ends bear flanges with conical tightening faces onto which acts an annular detachable clamp. Between the flange faces is disposed a centering ring with an annular rubber-elastic seal. The pipe axes are thereby made to coincide, the rubber-elastic seal is stayed and its compression is limited when the clamp is bolted tight. The thickness of the centering ring determines the flange distance and is defined, for example, according to the current ISO standard as 3.9 mm. Clamps encompass the flange and can also be realized as multipart, chain-like flanges. When applying pressure the centering ring is advantageously provided in the outer region of the flange and the seal subsequently lies in the inner region and is pressed onto the centering ring through the inner pressure. In vacuum applications the centering ring lies in the inner region and the seal is stayed against the inner portion. Such a small flange connection is described for example in CH 448 638. A further description can be found in the publication "Theorie und Praxis der Vakuumtechnik" by Wutz-Adam-Walcher, Vieweg Verlag, Second Edition 1982 (ISBN 3-528-04884-0) page 475.

The main nominal dimensions according to the standard for bolted flange connections are DN 63 ISO-K/100/160/200/250/320/400/500/630 ISO-K. K denotes herein clamp flange for the detachable securement by means of bolted flanges, clamps or claws. The dimensions are defined according to DIN 28404 and also ISO 1609/3669. A description of such bolted flange connections can be found in "Theorie und Praxis der Vakuumtechnik" by Wutz-Adam-Walcher, Vieweg Verlag, Second Edition 1982 (ISBN 3-528-04884-0) pp. 476-477.

According to this standardization one differentiates between:
a) Configuration with so-called rigid flanges which are secured each at one of the pipe ends to be connected. These have a rigid hole reference circle which serves for receiving bolts with which an annular seal located between the two rigid flanges is pressed, as has previously already been described for the small flange connection.
b) Configuration with so-called clamp flanges. These have an encircling slot-like turned flange groove into which laterally boltable clamps are hooked and subsequently tightened. Such flanges are rotatable before tightening.
c) Configuration with so-called overthrow flanges. These are provided with a hole reference circle and are bolted against one another. Before the tightening the flanges are rotatable. For example a rigid flange (for example according to ISO-F or DIN 2501) and an overthrow flange can be combined.

The several models of flange types or the type of bolting-together according to a to c can, on demand, be combined with one another.

In these known flange connections several differently formed centering rings are required for receiving and positioning the elastomer seal. For small flange connections, for example, five different centering rings are required in order to be able to cover all important applications, such as for vacuum, high overpressure, different required materials depending on the aggressiveness of the medium in the pipe line, as well as transition centering rings if different nominal flange dimensions are to be connected.

When used in vacuum technology it is undesirable that in these known small flange connections and bolted connections, regions with voids are generated, which release uncontrollably trapped gases and hereby represent sources of virtual leaks. Such virtual leaks are primarily formed with the configuration of the often utilized inner centering ring. Such leaks lead to undesirable impurities and long pump-down times in the generation of the vacuum and are in practice very difficult to locate. Vacuum technology involves extremely pure process applications and such leakage sites are therefore dreaded. In vacuum process systems often a multiplicity of connection sites is necessary and it is extremely important to avoid such uncontrollable virtual leaks.

SUMMARY OF THE INVENTION

The invention consequently addresses the problem of eliminating the disadvantages of prior art. The present invention in particular addresses the problem of providing a flange connection in which no virtual leaks occur, which cover all previously listed application variants utilizing as much as possible the same parts, and that the flange connection can be established simply, quickly and securely and can also be detached. The flange connection, moreover, is to be economically producible and operable.

The problem is solved in the flange connection of the species according to the characterizing feature of the invention. The claims relate to these and other advantageous physical forms of the invention.

According to the invention a flange connection comprises two pipe ends with pipe axes, on each of which one flange is disposed, which ends are detachably connected with one another forming a seal. In the radial direction with respect to the pipe axes the flanges have flange faces and are positioned opposite to one another wherein these faces encompass a centering ring with an elastomer sealing ring partially in contact with this ring. Both flanges include means for the detachable tightening of the two flange faces against one another such that the flange faces are in contact on the centering ring and are thereby held at a predetermined flange distance, and that the elastomer sealing ring is pressed on the flange faces in the direction parallel to the pipe axes, forming a seal. The centering ring is so positioned that it is at least partially in contact at the periphery of the flanges. On the centering ring are annularly, preferably centrally, disposed bearing means directed inwardly in the radial direction toward the pipe axis, about which the elastomer sealing ring, U-shaped in cross section, is disposed, such that on the side flanks of the U-shape on both sides an annular areal flange contact zone is formed.

This type of universal sealing arrangement is suitable for both flange types previously described. It can be utilized to special advantage in the small flange model and in particular in vacuum applications.

The various features of novelty which characterize the invention are pointed out with particularity in the claims annexed to and forming a part of this disclosure and are entirely based on the Swiss priority application no. 1556/08 filed Oct. 1, 2008.

BRIEF DESCRIPTION OF THE DRAWINGS

In the following the invention will be described schematically and by example in conjunction with Figures.

In the drawing the figures depict.

DESCRIPTION OF THE PREFERRED EMBODIMENT

In the following small flange configurations are depicted and described in FIGS. 1 to 6 and in FIGS. 7 to 15 are depicted bolted flange connections.

Figure 1:
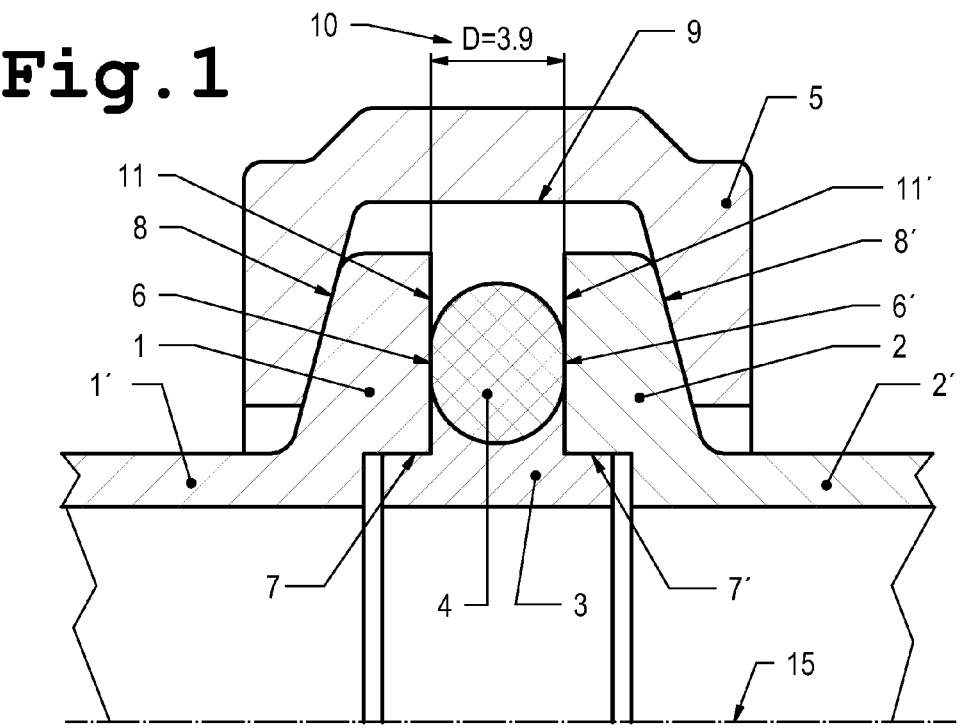
FIG. 1 schematically and in cross section a small flange connection according to prior art with an inner located centering ring suitable for vacuum and overpressure up to 2.5 $bar_{o[verpressure]}$, FIG. 2 schematically and in cross section a small flange connection according to prior art with an outer located centering ring, in particular suitable for overpressure up to 10 $bar_o$, FIG. 3 schematically and in cross section a small flange connection according to prior art with an inner located centering ring and two unlike pipe ends, suitable for vacuum and overpressure up to 2.5 $bar_o$, FIG. 4 schematically and in cross section a small flange connection according to prior art with an inner located centering ring and a depiction of an example of an undesirable void forming a virtual leak, FIG. 5 schematically and in cross section a small flange connection according to the invention with outer located centering ring and a U-shaped elastomer sealing ring disposed thereon and directed inwardly, suitable for vacuum and overpressure and different process gases, FIG. 6 a variant according to FIG. 5 with pipe ends without turned grooves for an inner centering ring. The flange geometry corresponds in this case not to the standardization according to Pneurop, FIG. 7 schematically and in cross section a clamp flange connection according to prior art with an inner located centering ring and an outer centering ring, suitable for vacuum and overpressure up to 2.5 $bar_o$, FIG. 8 schematically and in cross section a bolted flange connection with boltable overthrow flanges according to prior art with an inner located centering ring and an outer centering ring, suitable for vacuum and overpressure up to 2.5 $bar_o$, FIG. 9 schematically and in cross section a bolted flange connection as a clamp flange connection, in which the one flange is bolted with a claw against a plate-shaped flange, according to prior art with an inner located centering ring and an outer centering ring, suitable for vacuum and overpressure up to 2.5 $bar_o$, FIG. 10 a variant according to FIG. 9 without centering rings with an elastomer sealing ring inserted into a groove on one of the two flanges, FIG. 11 schematically and in cross section a bolted flange connection according to prior art according to FIG. 7 with an inner located centering ring and an outer centering ring and a depiction of an example of an undesirable void forming a virtual leak, FIG. 12 schematically and in cross section a bolted flange connection as a clamp flange connection according to the invention with outer located centering ring and an inwardly directed U-shaped elastomer sealing ring disposed thereon, suitable for vacuum and overpressure and different process gases, FIG. 13 schematically and in cross section a bolted flange connection with boltable overthrow flanges according to the invention with outer located centering ring realized according to FIG. 12, FIG. 14 schematically and in cross section a bolted flange connection as a clamp flange connection in which the one flange is bolted with a claw against a plate-shaped flange, according to the invention with outer located centering ring realized according to FIG. 12, wherein in the plate-shaped flange a turned hollow is disposed to receive a shank as a stop means of the centering ring, FIG. 15 schematically and in cross section a bolted flange connection realized as a clamp flange connection according to FIG. 14 with outer located centering ring, in which the centering ring on the side of the plate-shaped flange does not include a shank as a stop means and the plate-shaped flange is planar without a turned hollow.
Figure 2:
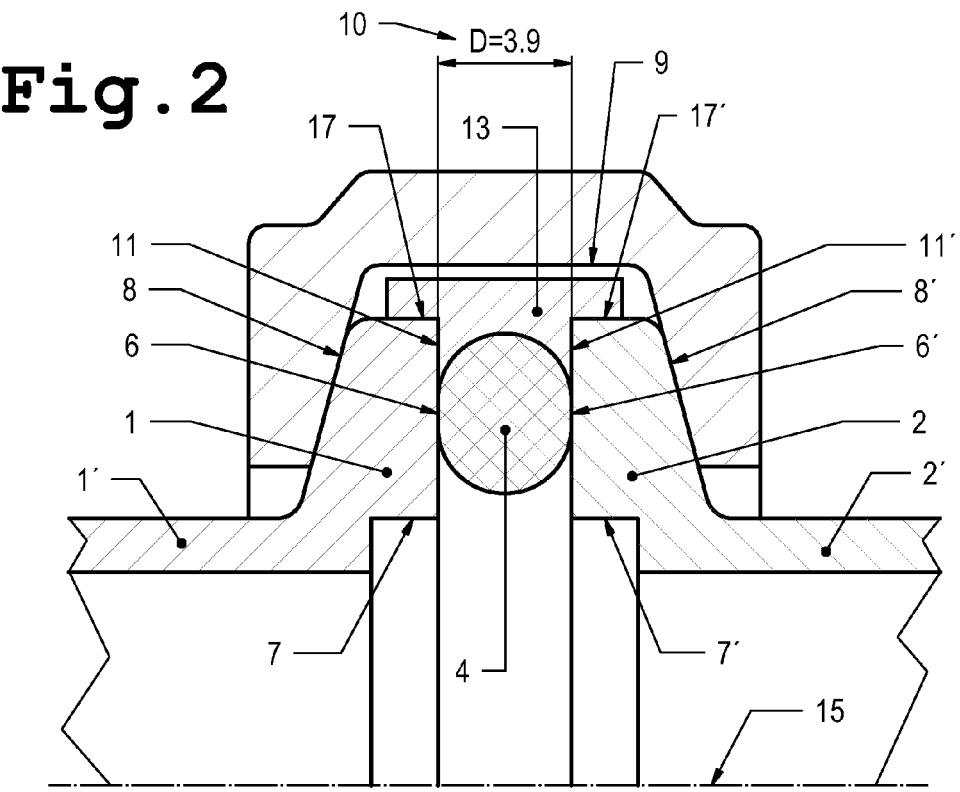

FIG. 1 shows schematically and in cross section the known manner according to prior art of realizing a small flange connection with two like pipe ends 1', 2' with pipe axis 15 and flanges 1, 2, disposed thereon. The flanges 1, 2 have in the radial direction one flange face 11, 11' each which in the assembled state are parallel to one another. Sealing takes place in the following manner: an inner centering ring 3 centers the flanges 1, 2 at the inner located contact faces 7, 7', which are formed by turned grooves at the pipe ends such that the centering ring 3 is set into these turned grooves. The thickness D of the centering ring defines the flange distance 10 while the two flange faces 11, 11' are in contact on this ring. An elastomer sealing ring 4, an O-ring seal, encompasses the centering ring 3 and has a greater diameter than the thickness D of the centering ring and is herein pressed such that on both sides annular flange contact zones 6, 6' are formed and this [ring] is thereby in contact on both sides on the flange faces 11, 11' forming a seal. The flange faces are therefore realized with a slight surface roughness as with grade N6 c. The two flanges 1, 2, include laterally conical tightening faces 8, 8', which are clamped together and held using a clamp 5 encompassing the flanges, which clamp is implemented in two or multiple parts, over the conical tightening faces 8, 8', in the direction of the pipe axes 15. Between the outer flange diameter and the clamp 5 sufficient free space 9 is provided for receiving an outer centering ring 13, disposed in between, as is depicted in FIG. 2. Depending on the application, the inner centering ring 3 can be comprised of aluminum or Inox and is suitable for vacuum applications and for applications with overpressure up to 2.5 $bar_o$.

A further variant of a small flange connection according to prior art is depicted schematically and in cross section in FIG. 2, in which two like pipe ends 1', 2' with pipe axis 15 and flanges 1, 2 disposed thereon are connected forming a sealing via an outer centering ring 13 located in between and on the outside. This outer centering ring 13 positions and centers the flanges 1, 2 at their outer diameters 17, 17' and, via its thickness D, sets the flange distance 10. An elastomer sealing ring 4, an O-ring seal, is located on the inner side of the outer centering ring 13 and has a greater diameter than the thickness D of the centering ring and herein pressed such that on both sides annular flange contact zones 6, 6' are formed and this ring is hereby in contact on both sides on the flange faces 11, 11' forming a seal. As described previously in FIG. 1, the two flanges 1, 2 are held together with a clamp 5 via the conical tightening faces 8, 8'. This outer centering ring is, for example, of aluminum and is suitable for applications with overpressure up to 10 bar$_o$.

A further variant of a small flange connection according to prior art is shown schematically and in cross section in FIG. 3, in which two unlike pipe ends 1', 2' with pipe axis 15 and flanges 1, 2 disposed thereon are connected via a transition centering ring 23 disposed in between and on the inside forming a seal. An elastomer sealing ring 4, an O-ring seal, encompasses the transition centering ring. The inner disposed transition centering ring 23 centers the flanges at the inner located contact faces 7, 7', which are formed by turned grooves on the pipe ends with different diameters, such that the centering ring 23 is fittingly set into these turned grooves. An elastomer sealing ring 4, an O-ring seal, is located on the outer side of the transition centering ring 23 and has a greater diameter than the thickness D of the transition centering ring and is herein pressed such that on both sides annular flange contact zones 6, 6' are formed and this ring is thereby in contact on both sides on the flange faces 11, 11' forming a seal. The two flanges 1, 2 are, as described previously in FIG. 1, held together with a clamp 5 via the conical tightening faces 8, 8'. Depending on the application, the inner located transition centering ring 23 can be, for example, of aluminum or Inox and is suitable for vacuum applications and for applications with overpressure up to 2.5 bar$_o$.

A sample configuration of the known, previously described small flange embodiments is shown in FIG. 4 in cross section, in which between the elastomer sealing ring 4 and the inner located centering ring 3, 23 one or several voids 12 are formed. These voids 12 form, for example, in the region of the contact faces 7, 7' between the centering ring and the flanges 11, 11' and/or under the elastomer sealing ring 4, the O-ring, more or fewer depending on the surface condition.

Such voids 12 form in particular in small flange connections with inner located centering ring with elastomer sealing ring encompassing this ring, as is shown in FIG. 4. The volumes of such enclosed voids can contain for example gases and/or materials, which subsequently after the pipe line has been evacuated, are given off into this pipe line uncontrollably and undesirably, whereby the quality, such as the attained pressure and/or the purity of the vacuum is decreased and/or the pumping-down time is extended. Impurities can also be formed through the inclusion of undesirable residues from the fabrication or the cleaning, through outgassing of substances desorbed here on the surfaces. Through this behaviour a type of virtual leak is formed. Such processes are undesirable in vacuum process installations and even make the use of processes with high purity requirements impossible.

A further disadvantage consists therein that in this known small flange connection for the introduced variants several, for example up to five, or even more different centering ring embodiments are necessary if the various applications are to be covered, such as for vacuum, for high overpressure, different suitable materials depending on the aggressiveness of the medium in the line and for transition centering rings when using different nominal flange dimensions. This requires overall increased expenditure.

Figure 5:
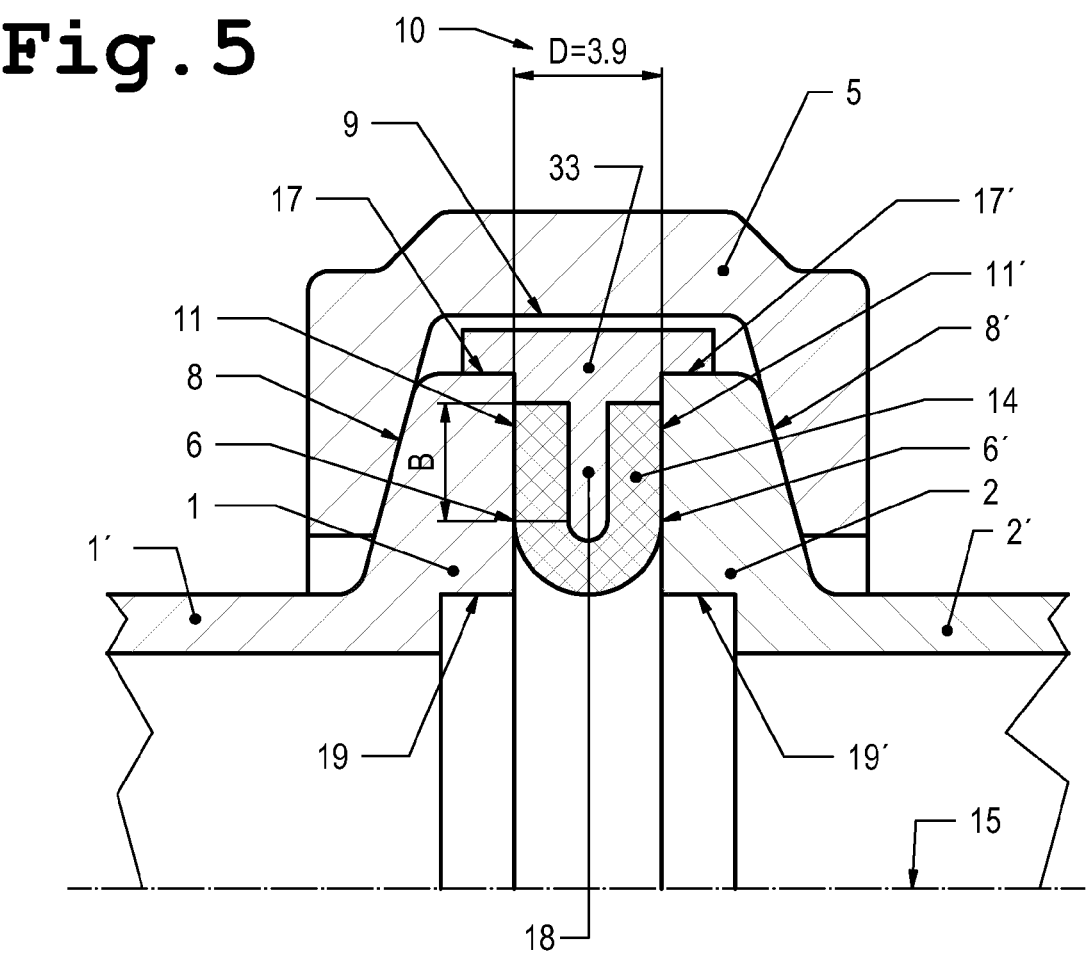
Figure 6:
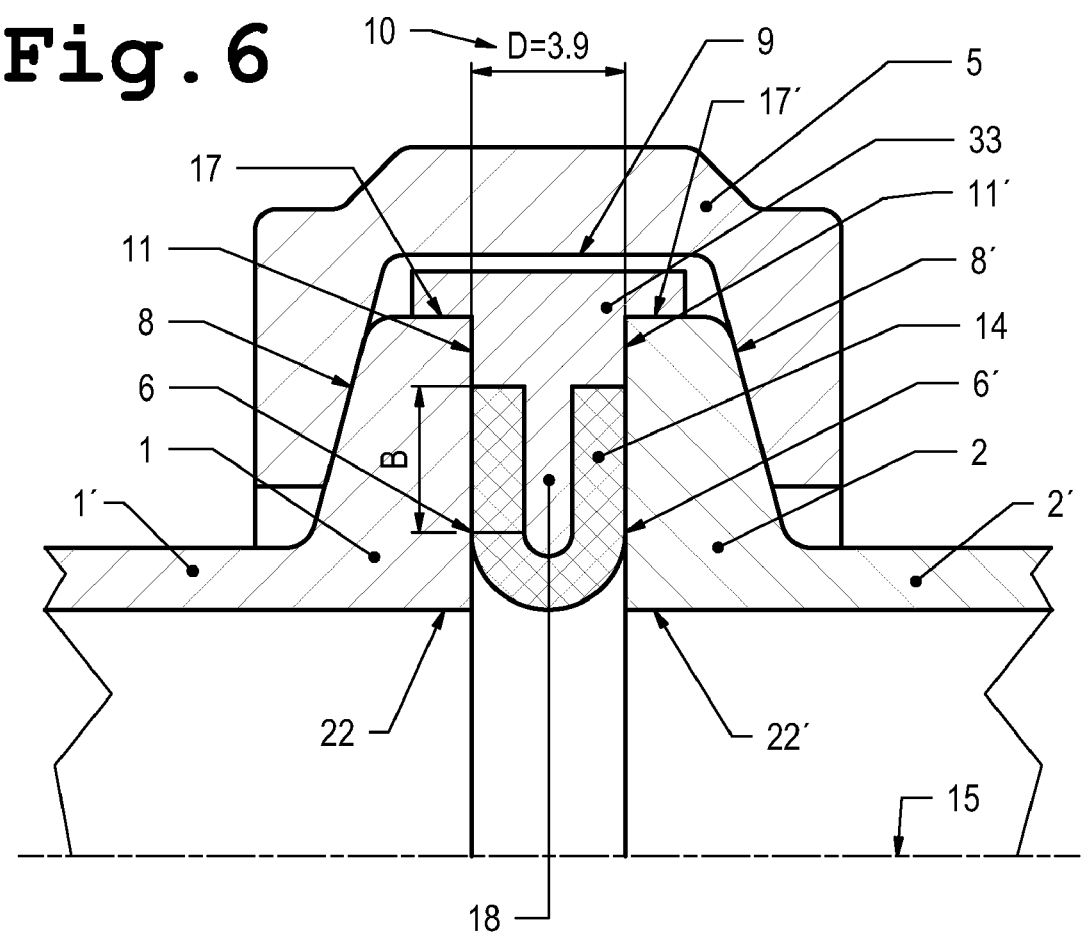

According to the invention a centering ring 33 is specifically realized, as is shown schematically in FIGS. 5 and 6. This centering ring 33 is formed as an outer located centering ring and bears inwardly directed U-shaped annular elastomer seals 14. The small flange connection with this centering ring 33 with elastomer sealing ring 14 is universally applicable and covers all previously listed application cases with the same structural parts and in particular with one and the same centering ring 33. In particular no undesirable voids are generated which can form virtual leaks.

The small flange connection according to the invention comprises two pipe ends 1', 2' with their pipe axes 15, on each of which one flange 1, 2 is disposed which include flange faces 11, 11' in the radial direction with respect to the pipe axes 15 and are positioned opposite one another and enclose a centering ring 33 with an elastomer sealing ring 14 in contact with these faces, and that both flanges 1, 2 on their side include each a conical tightening face 8, 8', which are encompassed and clamped with a detachable clamp 5 such that the flange faces 11, 11' are in contact on the centering ring 33 and thereby are held at a predetermined flange distance 10 and the elastomer sealing ring 14 is pressed on the flange faces 11, 11' in the direction of the pipe axes 15 forming a seal, wherein the centering ring 33 is positioned at least partially in contact on the periphery of the flanges 1, 2, and that thereon are disposed bearing means 18 directed annularly inwardly, about which the elastomer sealing ring 14, formed U-shaped in cross section, is disposed such that on the side flanks of the U-shape on both sides an annular areal flange contact zone 6, 6', width B is formed.

The centering ring 33 is located outside and bears at the outer circumference stop means which are at least partially in contact on the outer flange diameters 17, 17' and hereby center the flanges 1, 2 to the pipe axis 15. The bearing means 18 are advantageously disposed centrally or centered on the centering ring 33 directed inwardly toward the pipe axis 15. The bearing means 18 are fixed annularly distributed on the centering ring 33, however, advantageously form an annular encircling web, a type of bearing nose. The centering ring 33, together with the bearing web is advantageously fabricated of one piece. The gases in the pipe line do not "see" the outer located centering ring 33 and consequently its material can be selected freely as required such as be of synthetic material, aluminum, Inox, wood, etc. and be formed electrically conducting or electrically insulating.

The elastomer sealing ring 14 is disposed curved in cross-sectional U-shape about the bearing means 18, such as the bearing web 18. It is especially advantageous if this ring is vulcanized directly onto the bearing means 18. It is thereby securely fixed and held in position on the bearing means 18 and can not be pulled into the region of the pipe cross section during the vacuum application. The sealing can however also be clamped on in certain cases.

The lateral shanks of the U-shaped elastomer sealing form on both sides an annular areal flange contact zone 6, 6' with width B as for an annular sealing face. This sealing face is already provided in the non-pressed state as a face, in contrast to prior art, where the O-ring sealing forms an annular line in the flange contact zone 6, 6'. This new U-shaped elastomer sealing ring 14 with the sealing faces forms a very reliable and reproducible sealing arrangement whereby additionally the handling is simplified.

Furthermore, it is thereby ensured that the flange contact zones 6, 6' come to lie far back with respect to the pipe axis and there already at the beginning of the contact, thus at the beginning of the U radius, seal securely and no undesirable voids are enclosed in the sealing face regions themselves. Virtual leaks can no longer form with this arrangement.

It is advantageous if the width B of the flat U-shank of the elastomer sealing ring 14 is in the range of the 3.0- to 10.00-fold of the flange distance 10 or of the thickness D of the centering ring 33.

This small flange connection is especially suitable for flange connections with nominal dimensions of the pipe ends 1', 2' with the flanges 1, 2 in the range from 10 to 300 mm, preferably in the range from 10 to 60 mm.

Centering recesses 19, 19' as turned centering grooves interiorly on the pipe ends 1', 2' or at the flanges 1, 2 can also be omitted and the pipe 1', 2' can have the same diameter as the structural part diameter. This leads in this case to further simplification and thus to cost reductions.

According to the invention the same outside-lying centering ring embodiment with a U-shaped elastomer sealing, as has been described above in the small flange configuration, can advantageously also be applied in bolted flange connections, as is depicted by example in FIGS. 7 to 15.

The centering ring 33, 34 is herein also realized as an outside-lying centering ring and bears an inwardly directed U-shaped and annular elastomer sealing 14, 54. The bolted flange connection with this centering ring 33, 34 with elastomer sealing ring 14, 54 is also universally applicable and covers all previously listed application cases using the same structural parts and, in particular, substantially with the same centering ring embodiment. In particular, no undesirable voids are generated which could lead to virtual leaks.

Figure 7:
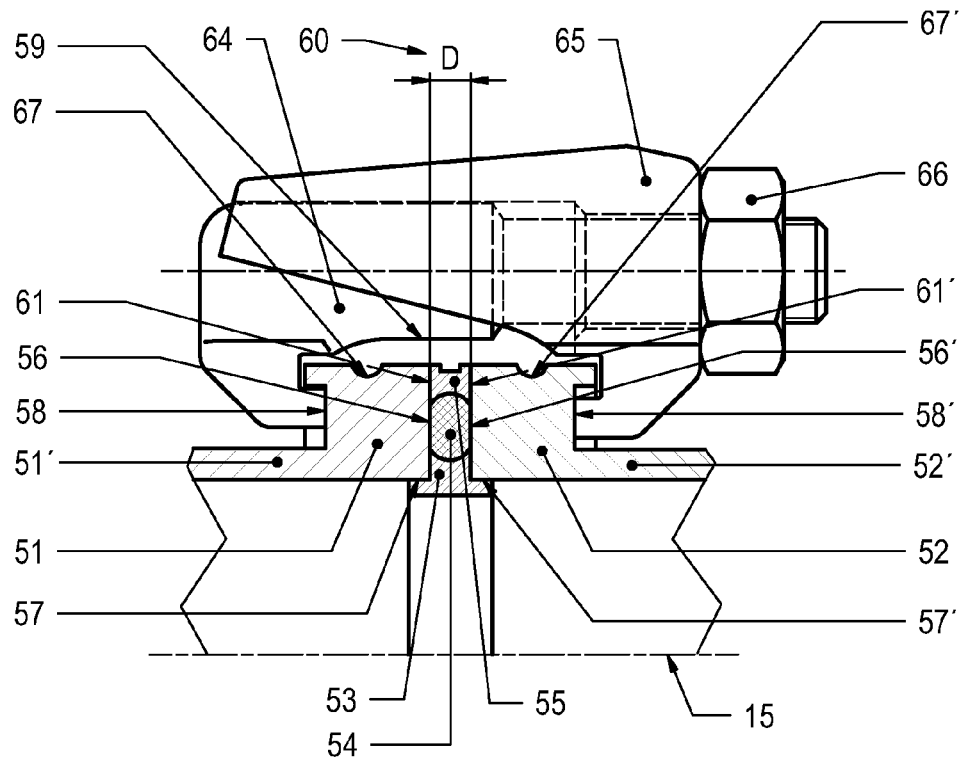

FIG. 7 shows a known bolted flange connection with a bolted clamp 65 disposed on the flange periphery, also referred to as clamp flange. Two like pipe ends 51', 52' with flanges 51, 52 disposed thereon are sealed in the following manner: a centering ring 53 located within the elastomer sealing 54 centers the flanges 51, 52 on the inner diameter with the contact faces 57, 57' at a flange distance D, 60. Depending on the nominal dimension, D can vary between, for example, 3.9 to 5.6 mm. With larger nominal dimensions of the pipe, for example from 300 mm to 1000 mm, a greater distance, for example 5.6 mm, is utilized. The annular elastomer sealing 54 is pressed such that it is in contact on the two flange contact zones 56, 56' and forms a seal. The contacting flange contact faces 61, 61', on which the inner and the outer centering rings 53, 55 are in contact, as sealing faces have a lesser roughness, preferably better than N6 c. The flanges 51, 52 are held together using a bolted connection 66 with several 2-part clamps 64, 65 which are hooked in both flanges on turned grooves 58, 58'. The clamp 64, 65 allows toward the inside a sufficiently large free space 59 for receiving an outer centering ring 55 at the periphery of the flanges. Depending on the application, the inner centering ring 53 can be of aluminum or Inox and is suitable for vacuum up to overpressure of 2.5 $bar_o$. The outer centering ring 55 is comprised of aluminum since it does not "see" the vacuum.

Figure 8:
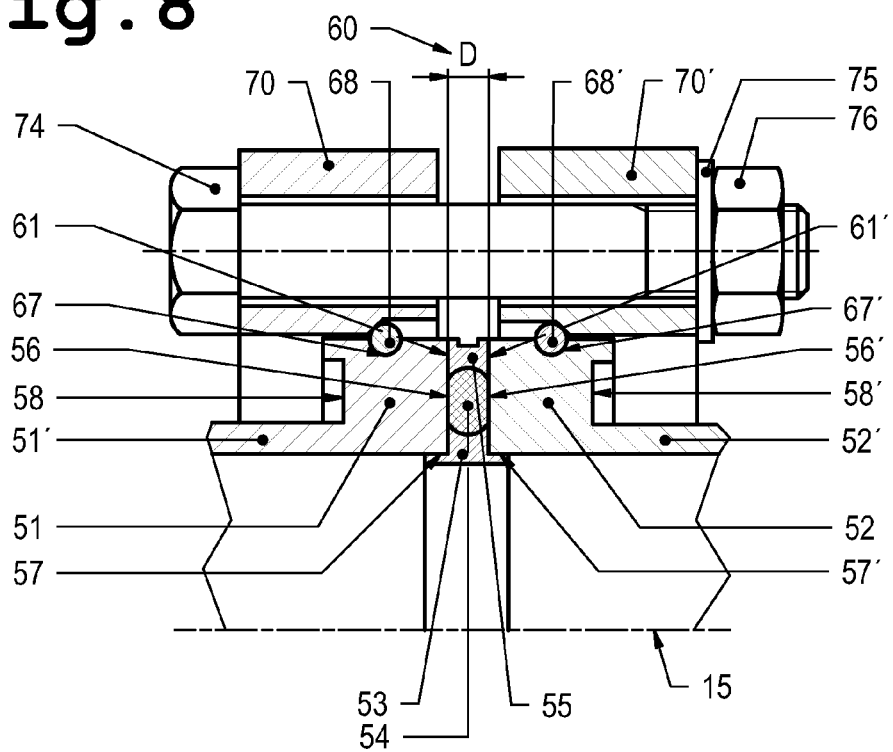

A further known bolted flange connection is shown in FIG. 8. Instead of clamps 64, 65, overthrow flanges 70, 70' with hole reference circles are pressed using bolts for clamping the elastomer sealing 54 with the stay or centering rings 53, 55. These flanges are also referred to as rotary flanges since they can be rotated. In addition, one semicircular groove 67, 67' encompasses the flanges at their circumference with one emplaced snap ring 68, 68' each. Each of these forms a stop for the overthrow flanges 70, 70'. With clamp bolts 74, washers 75 and nuts 76 the overthrow flanges 70, 70' are held together and the force for the pressing to the dimension D, 60 of an O-ring elastomer sealing 54 is generated.

Figure 9:
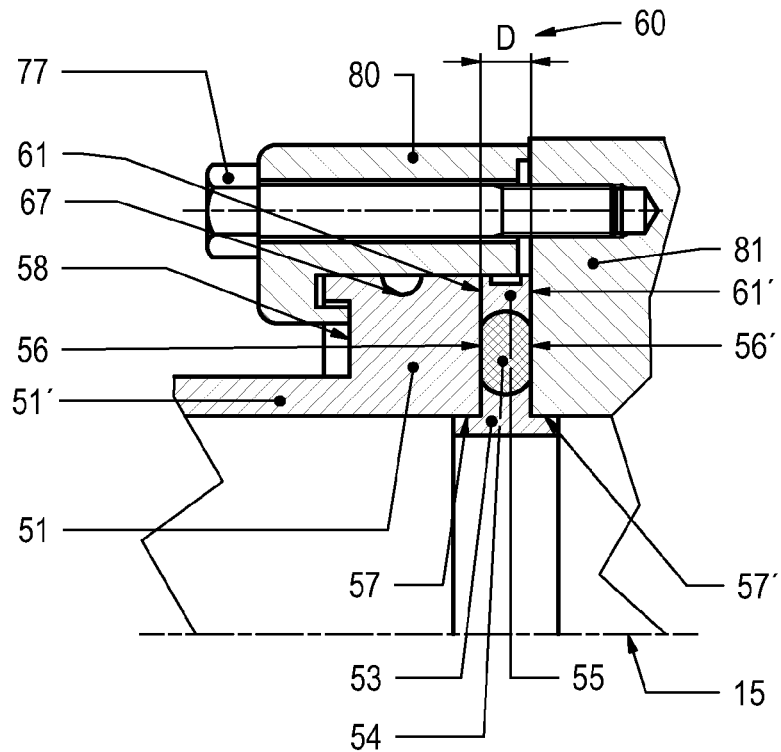

A combination of a clamp flange 51 with a plate 81 according to prior art is shown in FIG. 9.

The form-fit, sealing connection is generated via claws 80, which are hooked on the clamp flange 51 at a turned flange groove 58 and anchored via bolts 77 in the plate 81 and thereby clamp in the axial pipe direction. The inner and outer lying centering rings 53, 55 and the O-ring 54 are pressed between the clamp flange 51 and plate 81 forming a seal.

Figure 10:
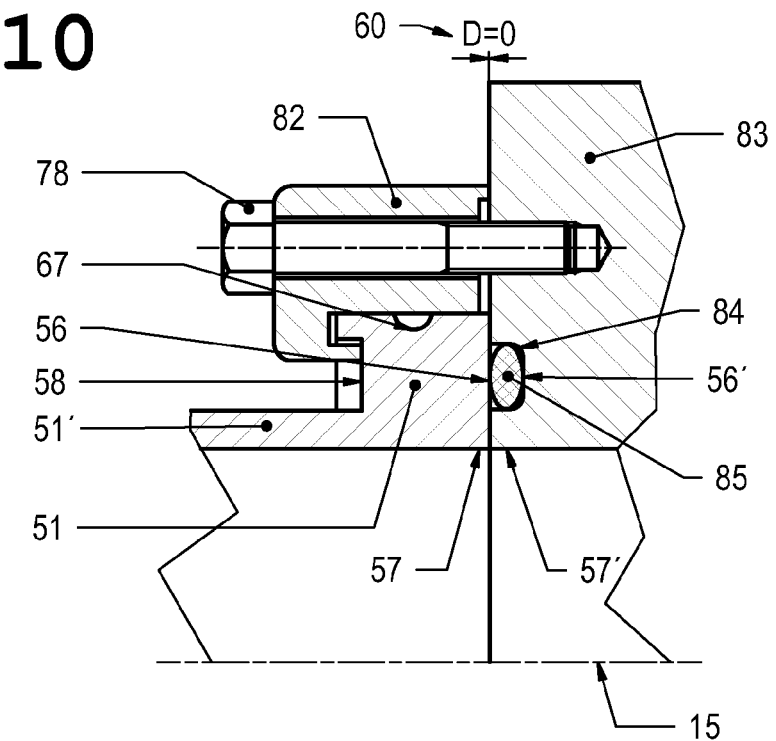

A further known variant of a combination of a clamp flange 51 with a plate 81 is shown in FIG. 10. The form-fit, sealing connection is generated via claws 80, which are hooked on the clamp flange 51 at the turned flange groove 58 and anchored via bolts 77 in the plate 83 and thereby clamp in the axial pipe direction. The O-ring 85 is embedded in an encircling groove 84 in the plate 83. No centering rings are necessary in this case and the distance D between flange 51 and plate 83 approaches toward zero.

In the known configurations according to prior art, such as are depicted in FIGS. 7 to 10, the parts must be fabricated of different suitable materials depending on the aggressiveness of the medium in the line.

Figure 11:
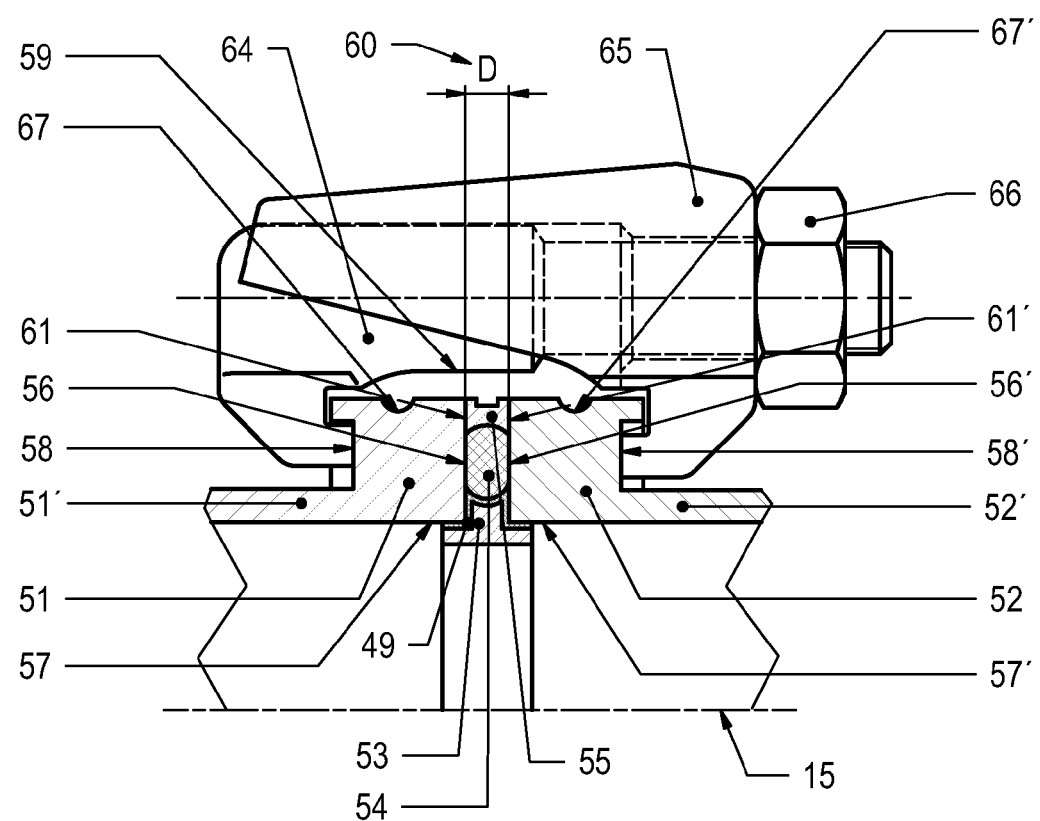

In terms of vacuum technology it is highly disadvantageous, and thus undesirable, that in these known bolted flange connections voids 49 are incorporated which form virtual leakage sites, in particular due to the required inner centering ring 53, as has already been described above in connection with the small flange connection and is shown in FIG. 11. On the flange contact faces 56, 56' with the contact faces 61, 61' of the centering rings 53, 55, and in particular with respect to the inner centering ring 53 and beneath the O-ring 54, small voids 49 can become incorporated, more or fewer depending also on the surface condition of the involved parts. In these voids are stored undesirable substances and subsequently during the evacuation released into the vacuum or the medium uncontrollably and undesirably. Contained therein can be, for example, undesirable residues from the fabrication or cleaning, gases which are subsequently outgassed or substances and gases can be desorbed and given off again.

According to the invention a centering ring 33, 34 specifically is realized, such as is depicted schematically and by example in FIGS. 12 to 15. This centering ring 33, 34 is realized as an outside-lying centering ring and bears an inwardly directed, U-shaped and annular elastomer sealing 14. The bolted flange connection with this centering ring 33, 34 with the elastomer sealing ring 14 is universally applicable and covers all previously described application cases using the same structural parts and, in particular, substantially with the same centering ring structure 33, 34. In particular no undesirable voids are formed which can form virtual leaks. The formation of the centering ring 33, 34 with the bearing means 18 with elastomer sealing 14 disposed thereon, is analogous, as already previously described for the small flange configuration.

The material for the elastomer sealing 14, 54 is advantageously also vulcanized directly onto the inwardly directed bearing means 18, such as a bearing web, and is thereby fixed on the outer centering ring 33, 34. Due to this formation, the flange contact zones 56, 56' of the elastomer sealing 14, 54 are as far as possible inwardly directed such that virtual leaks are largely avoided. The gases in the pipe line consequently do not "see" the outer centering ring 33, whereby the material of the outer centering ring 33 can be correspondingly freely selected, such as, for example, from synthetic materials, aluminum, Inox, wood, etc. and even from materials which are electrically conducting or insulating depending on the requirements.

Figure 12:
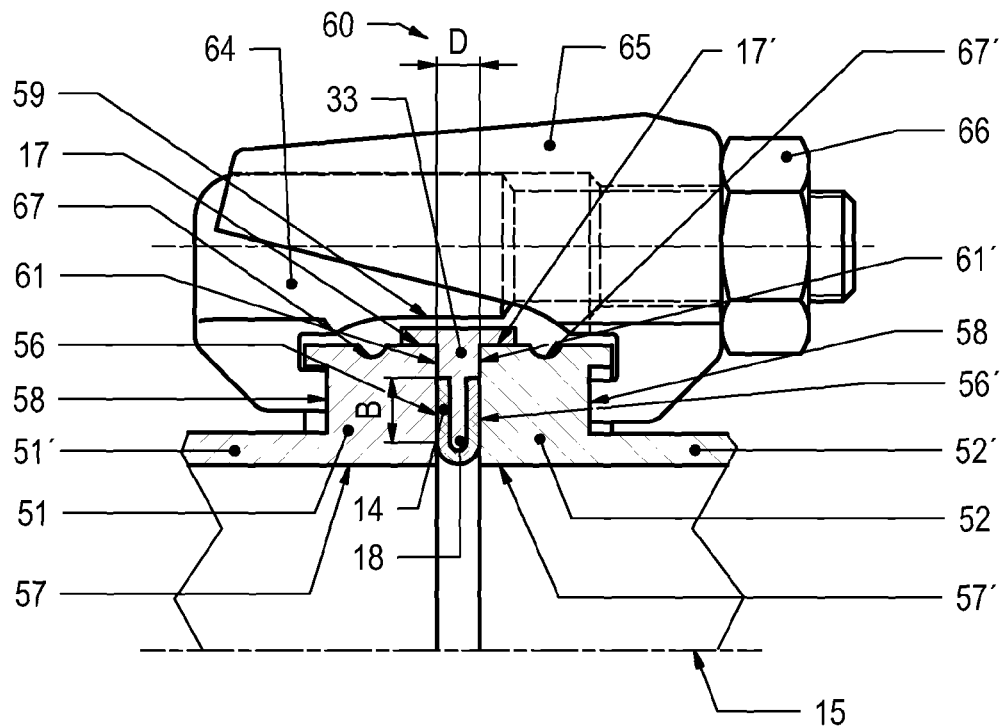

In the formation according to the example according to FIG. 12, the flanges 51, 52, as is known and shown in FIG. 7, are held together with several 2-part clamps 64, 65, 66 and the free space 59 for the emplacement of the outer centering ring 33, 34 according to the invention is thereby already provided. The vulcanization-on advantageously prevents that the material of the elastomer sealing 14 is drawn inwardly through the vacuum in the pipe line. Sealing faces 61, 61' on the flanges 51, 52 are less prone to scratches leading to leakage since the U-sealing 14 is in contact over an area and not in the form of lines.

Figure 13:
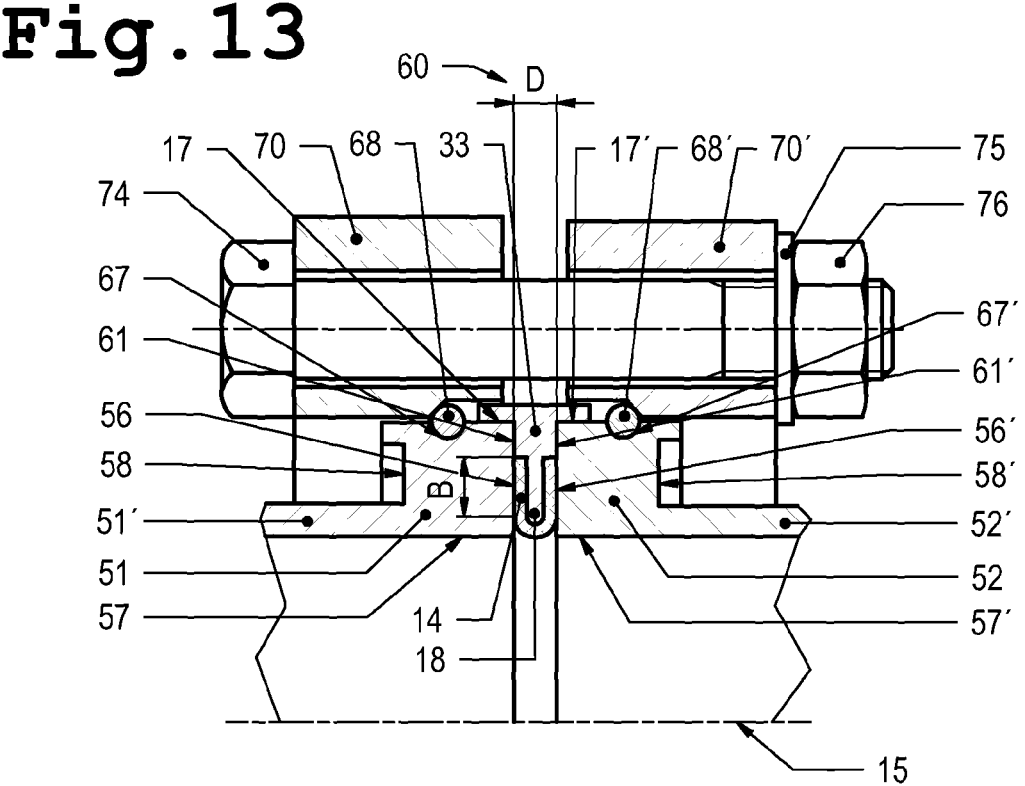

The rotary flange configuration as previously described in FIG. 8 is modified according to the invention corresponding to the depiction in FIG. 13. Herein the outer centering ring 33 is positioned in the free space beneath the rotary flange 70, 70'. On the outer centering ring are laterally disposed web-like bearing means such that it can lie in contact on the two flange outer diameters 17, 17'.

Figure 14:
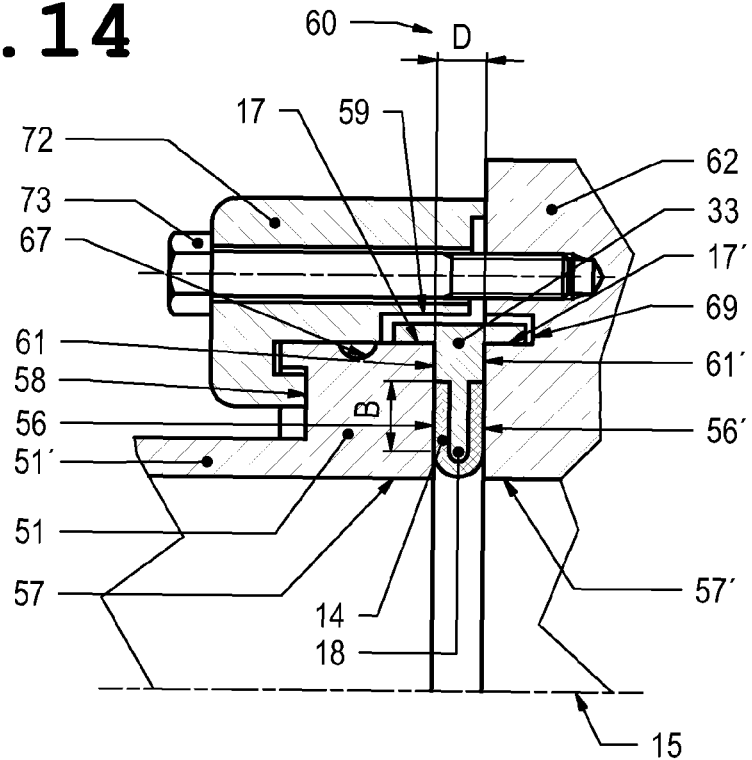

In the variant with plate-shaped flange according to FIG. 9, according to the invention for receiving the lateral web of the outer centering ring 33, a turned hollow 69 is provided in plate 62, as is shown in FIG. 14.

Figure 15:
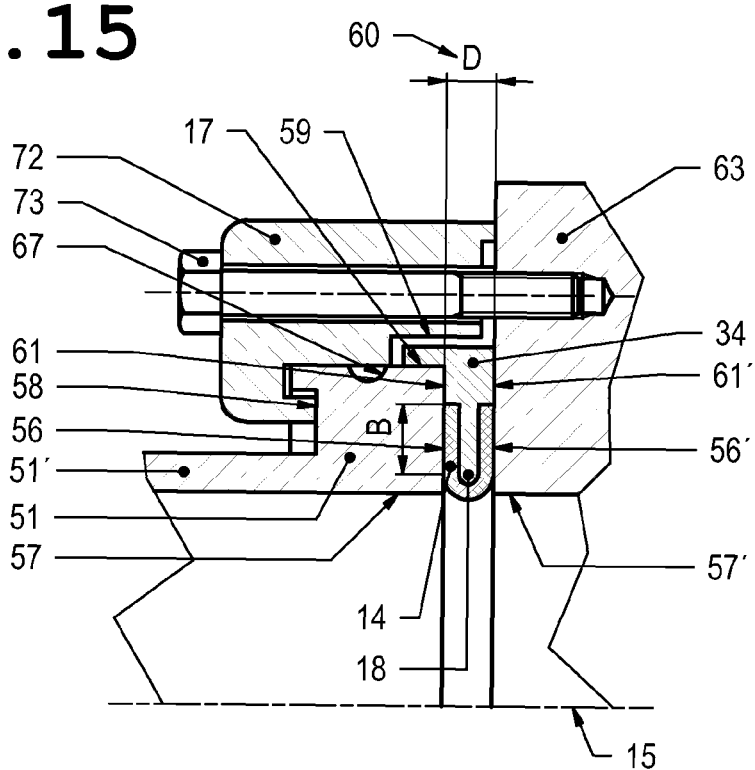

As had already been described in conjunction with FIG. 10 in the known embodiment with plate-shaped flange, the plate 63 can also be realized without a turned hollow 69. In this case, as depicted in FIG. 15, according to the invention the web or the contact resting shank of the outer centering ring 34 on the side of the plate 63 can be omitted. The centering in this case takes place only at the outer diameter of the opposite flange 51.

The plates 81, 83, 62, 63 depicted in FIGS. 9, 10, 14 and 15 are preferably portions of a chamber wall, in particular portions of a vacuum chamber, and preferably include a round opening. Via this opening under seal and detachably a pipe with a pipe end 1', 51' with flange 1, 51 disposed thereon, can be disposed as had already been described previously in the connection of two pipe pieces. The medium can thereby communicate with the chamber via a pipe inlet. According to the invention the same U-shaped elastomer sealing ring 14, 54, as previously described, is pressed between the one flange and the plate and positioned as a seal. The plate assumes herein the same function as a second flange 2, 52 as a counterpiece to the first flange 1, 51 and the opening corresponds in this case to the second pipe end 2', 52'.

Bolted flange connections with the outer centering ring according to the invention with U-shaped elastomer sealing are especially suitable for nominal dimensions of the pipe ends 51', 52' with flanges 51, 52, which are in the range from 60 to 1000 mm, preferably in the range from 100 to 630 mm.

What is claimed is:

1. A flange connection with two pipe ends (1', 2', 51' 52') with pipe axes (15), on each of which one flange (1, 2, 51, 52) is disposed, which, in the direction radial to the pipe axes (15) include flange faces (11, 11', 61, 61') and are positioned opposite one another, comprising: a centering ring (33, 34) enclosed by the flange faces, an elastomer sealing ring (14, 54) that is at least partially in contact with the centering ring, both flanges (1, 2, 51, 52) comprising means for the detachable clamping of the two flanges (1, 2, 51, 52) against one another such that the flange faces (11, 11', 61, 61') are in contact on the centering ring (33, 34) and thereby are held at a predetermined flange distance (10, 60, D) and the elastomer sealing ring (14, 54) is pressed on the flange faces (11, 11', 61, 61') in the direction parallel to the pipe axes (15) forming a seal, and wherein the centering ring (33, 34) is positioned such that it is at least partially in contact on the periphery of the flanges (1, 2, 51, 52) and in the radial direction to the pipe axes (15), and that thereon are disposed annularly inwardly directed bearing means (18), about which the elastomer sealing ring (14, 54), formed to be U-shaped in cross section, is disposed such that on the side flanks of the U-shape on both sides an annular areal flange contact zone (6, 6', 56, 56', B) is formed.

2. The flange connection as claimed in claim 1, wherein the bearing means (18) is formed as an annular bearing nose.

3. The flange connection as claimed in claim 1, wherein the elastomer sealing ring (14, 54) is fixed on the bearing means (18).

4. The flange as claimed in claim 1, wherein the U-shaped elastomer sealing ring (14, 54) in the radial direction to the pipe axis (15) has a width (B) of the flat U-shank in the range of the 3- to 10-fold of the flange distance (10, 60, D).

5. The flange connection as claimed in claim 1, wherein the flange connection is a small flange connection, wherein both flanges (1, 2) comprise on their side one conical tightening face (8, 8') each which are encompassed with a detachable clamp (5) such that they are clamped in such manner that the flange faces (11, 11') are in contact on the centering ring (33) and thereby are held at the predetermined flange distance (10) and the elastomer sealing ring (14, 54) is pressed on the flange faces (11, 11') in the direction of the pipe axes (15) forming the seal, and that the diameter of the pipe ends (1', 2') with the flanges (1, 2) is in the range from 10 to 300 mm.

6. The flange connection as claimed in claim 1, wherein the flange connection is a bolted flange connection comprising a clamp flange connection with bolted clamps (64, 65, 72) disposed at the periphery of the flanges and the diameter of the pipe ends (51', 52') with the flanges (51, 52) is in the range from 60 to 1000 mm.

7. The flange connection as claimed in claim 1, wherein the flange connection is a small flange connection, wherein both flanges (1, 2) comprise on their side one conical tightening face (8, 8') each which are encompassed with a detachable clamp (5) such that they are clamped in such manner that the flange faces (11, 11') are in contact on the centering ring (33) and thereby are held at the predetermined flange distance (10) and the elastomer sealing ring (14, 54) is pressed on the flange faces (11, 11') in the direction of the pipe axes (15) forming the seal, and that the diameter of the pipe ends (1', 2') with the flanges (1, 2) is in the range from 10 to 60 mm.

8. A flange connection with a pipe end (1', 51') with a pipe axis (15) on which a flange (1, 51) is disposed and with a plate (81, 83, 62, 63) with an opening, whose axis coincides with the pipe axis (15), wherein in the radial direction to the pipe axis (15) the flange and the plate include faces (11, 11', 61, 61') and the faces are positioned such that they oppose one another, comprising: a centering ring (33, 34) enclosed by the faces, an elastomer sealing ring (14, 54) at least partially in contact with the centering ring, the flanges (1, 2, 51, 52) including means for the detachable clamping of the flange (1, 51) and the plate (81, 83, 62, 63) against one another such that the faces (11, 11', 61, 61') are in contact on the centering ring (33, 34) and thereby are held at a predetermined flange distance (10, 60, D) and the elastomer sealing ring (14, 54) is pressed on the faces (11, 11', 61, 61') in a direction parallel to the pipe axis (15), forming a seal, and wherein the centering ring (33, 34) is at least partially in contact on the periphery of the flange (1, 52) and is positioned in the radial direction to the pipe axis (15) and that thereon, annularly directed inwardly bearing means (18) are disposed about which the elastomer sealing ring (14, 54), formed to be U-shaped in cross section, is disposed, such that on the side flanks of the U-shape on both sides an annular areal flange contact zone (6, 6', 56, 56', B) is formed.

9. The flange connection as claimed in claim 8, wherein the bearing means (18) is formed as an annular bearing nose.

10. The flange connection as claimed in claim 8, wherein the elastomer sealing ring (14, 54) is fixed on the bearing means (18).

11. The flange connection as claimed in claim 8, wherein the U-shaped elastomer sealing ring (14, 54) in the radial direction to the pipe axis (15) has a width (B) of the flat U-shank in the range of the 3- to 10-fold of the flange distance (10, 60, D).

12. The flange connection as claimed in claim 1, wherein the flange connection is a small flange connection, wherein the flanges (1, 2) comprise on their side opposite their faces one conical tightening surface (8, 8') each which are encompassed with a detachable clamp (5) such that they are clamped in such manner that the faces (11, 11') are in contact on the centering ring (33) and thereby are held at the predetermined flange distance (10) and the elastomer sealing ring (14, 54) is pressed on the flange faces (11, 11') in the direction of the pipe axes (15) forming the seal, and that the diameter of the pipe ends (1', 2') with the flanges (1, 2) is in the range from 10 to 300 mm.

13. The flange connection as claimed in claim 8, wherein the flange connection is a bolted flange connection comprising a clamp flange connection with bolted clamps (64, 65, 72) disposed at the periphery of the flanges and that the diameter of the pipe ends (51', 52') with the flanges (51, 52) is in the range from 60 to 1000 mm.

* * * * *

UNITED STATES PATENT AND TRADEMARK OFFICE
CERTIFICATE OF CORRECTION

| | | |
|---|---|---|
| PATENT NO. | : 7,914,053 B2 | Page 1 of 1 |
| APPLICATION NO. | : 12/537024 | |
| DATED | : March 29, 2011 | |
| INVENTOR(S) | : Pierino Keller and Pascal Good | |

It is certified that error appears in the above-identified patent and that said Letters Patent is hereby corrected as shown below:

On the Title page, correct field (30) to read as follows:

(30) Foreign Application Priority Data

Oct. 1, 2008   (CH) ............................................ 1556/08

Signed and Sealed this

Sixteenth Day of August, 2011

David J. Kappos
*Director of the United States Patent and Trademark Office*